No. 777,110. PATENTED DEC. 13, 1904.
W. KOLLER.
MACHINERY FOR THE TRANSMISSION OF MECHANICAL POWER.
APPLICATION FILED MAR. 24, 1904.
NO MODEL. 2 SHEETS—SHEET 1.
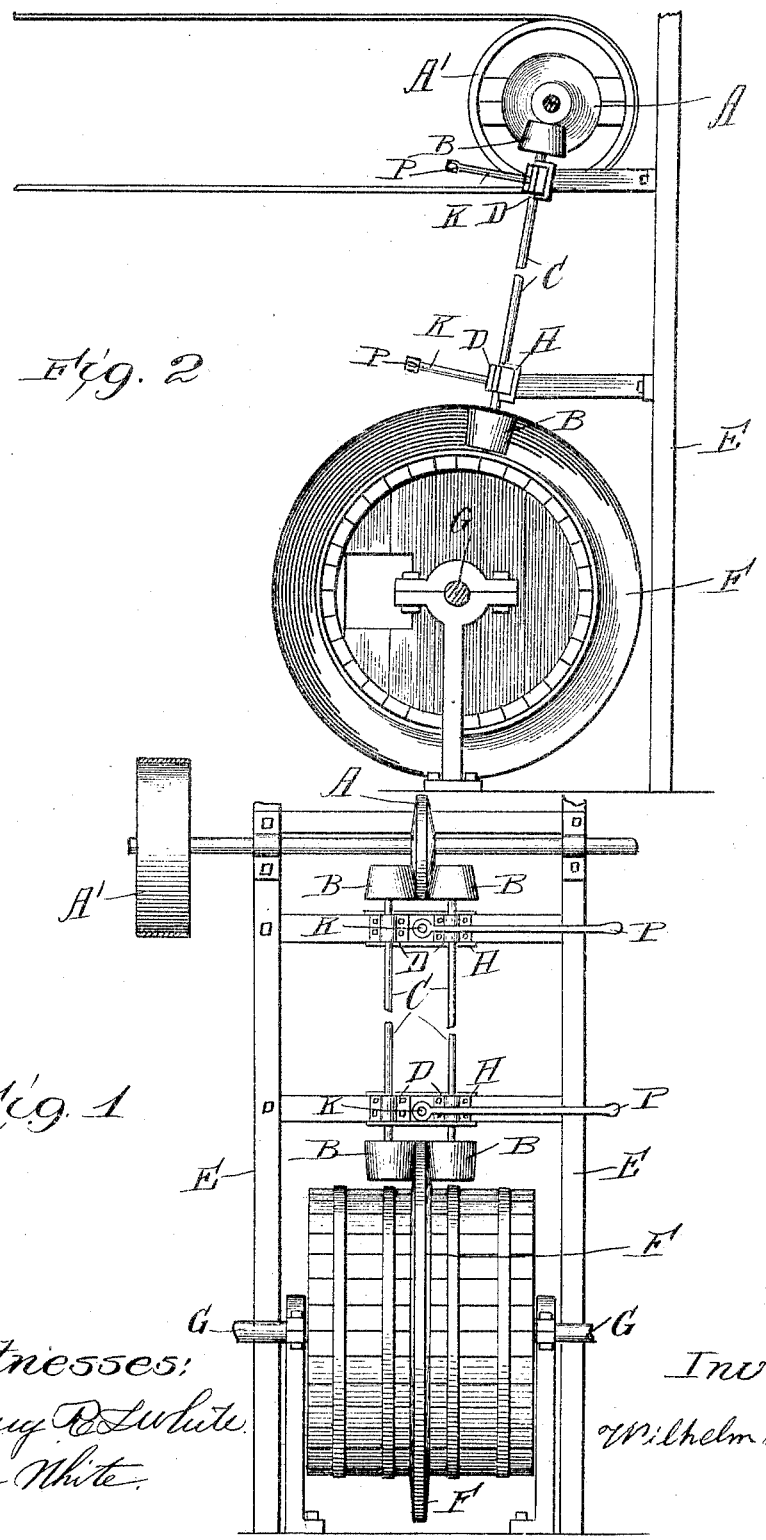
Witnesses:
Harry R. White
Ray White
Inventor
Wilhelm Koller

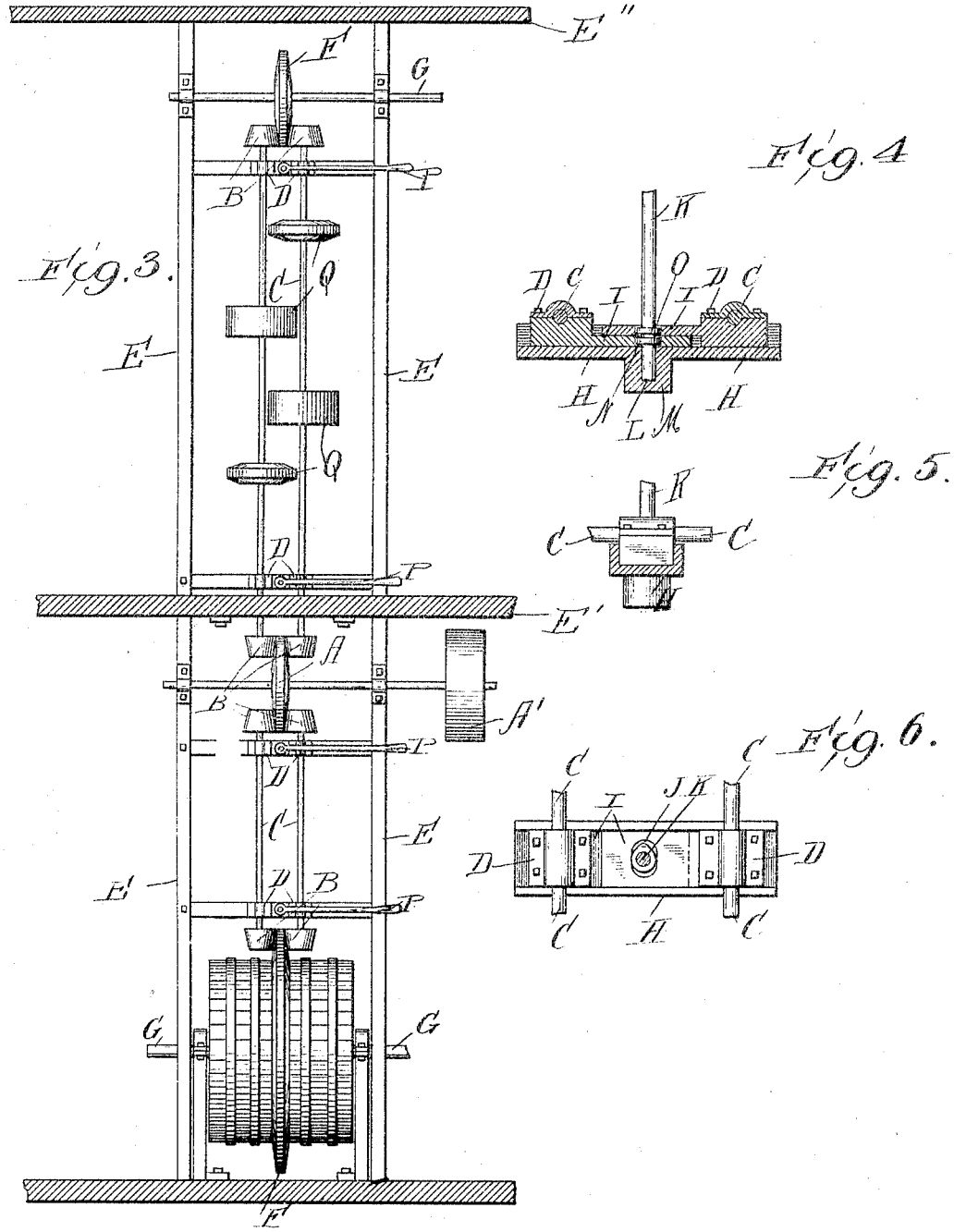

No. 777,110. Patented December 13, 1904.

UNITED STATES PATENT OFFICE.

WILHELM KOLLER, OF CHICAGO, ILLINOIS, ASSIGNOR OF ONE-HALF TO LEOPOLD STEIN, OF CHICAGO, ILLINOIS.

MACHINERY FOR THE TRANSMISSION OF MECHANICAL POWER.

SPECIFICATION forming part of Letters Patent No. 777,110, dated December 13, 1904.

Application filed March 24, 1904. Serial No. 199,863. (No model.)

*To all whom it may concern:*

Be it known that I, WILHELM KOLLER, a subject of the Emperor of Austria-Hungary, whose residence and post-office address are at No. 528 North Halsted street, in the city of Chicago, in the county of Cook and State of Illinois, have invented a new and useful Improvement in Machinery for the Transmission of Mechanical Power, of which the following is a specification.

My invention relates to that class of machines which are used for the transmission of mechanical power from a primary motor to other rotary machinery.

The object of my invention is to provide a transmitting-machine which will transmit the rotary motion of the initial driving machinery to a machine or machines by friction, thereby avoiding the use of belting, cables, or toothed gears; that can be set at any angle in the plane in which the initial driving-wheel rotates; that is operated by contact with a part only of the driving-wheel, and thereby permits of the contact and operation of two or more transmitting-machines with and by the one driving-wheel; that will occupy less space than other transmitting-machines; that can be connected with and disconnected from the driving and driven machines; that can be stopped and started more quickly and safely; that is safer in operation; that is operated with less loss of power and is more cheaply and easily constructed than other transmitting-machines.

I attain these objects by the mechanism illustrated in the accompanying drawings, in which—

Figure 1 is a front elevation of the machine in operative contact with the driving and driven machinery. Fig. 2 is a side elevation showing the machine set at an acute angle to the perpendicular in contact with the driving and driven machinery. Fig. 3 is a front elevation of two transmitting-machines placed vertically one above the other and driven by the same driving-wheel, the upper machine extending through the flooring and provided with several pulleys to illustrate the several ways by which power may be transmitted to other machines set in different positions in relation to the initial driving-wheel. Fig. 4 is a longitudinal sectional view of the bearings supporting the shafting of the machine. Fig. 5 is a cross-sectional view of Fig. 4. Fig. 6 is a plan view of Figs. 4 and 5.

In the drawings similar letters indicate similar parts in the several views.

The driving-wheel A is connected in any suitable way with the motive power. It is made of any suitable material and size and may be set up at such angle with the horizontal or perpendicular lines of the building as may be desired. The friction-wheels B are made of suitable size and material. The shafts C, on which the wheels B are attached, are made of any required length and are supported in the bearings D. These bearings are adjustably supported in the bearing-boxes H, affixed to the frames E. The driven wheels F are secured to the periphery of the driven machine or to the shaft G.

In Fig. 3 the driving-wheel A is supported above the driven machine, which is set upon the floor, and connection is made by a short transmitting-machine. Above the driving-wheel and extending through the upper floor is a long transmitting-machine adapted to impart motion to the driven wheel F', supported near the floor E''. The shafting of this long transmitter is provided with several pulleys Q suitable for the transmission of power to other machines set at right angle to the line of the shafts C.

In Figs. 4, 5, and 6, H is a bearing-box, which is attached to the frames E. In this box the bearings D are adjustably secured and are adapted to be moved toward and from each other. Each of these bearings is provided with an extended part I, arranged to lap each other. In these extensions are corresponding apertures J of oblong form, through which a shaft K extends and is supported in the bearing L in the projection M on the bottom of the box H. On this shaft K are two eccentrics N and O, arranged one above the other on opposite sides of the shaft. These eccentrics are adapted to fit in the apertures J and with the partial rotation of the shaft K force the bearings D from or toward each other and the wheels B into and out of contact with the driving and driven wheels. The operation of each pair of bearings is independent of the other. The shaft K is operated by a lever P.

What I claim as my invention, and desire to secure by Letters Patent, is—

1. The combination with a driving friction-wheel A, of a transmitting-machine having two pairs of wheels B, a pair of shafts C lying in the same plane and supporting said wheels, two pairs of bearings D adjustably secured in their respective bearing-boxes H, each of said bearings having extensions I and apertures J; a pair of boxes H adapted to support said bearings; each of said boxes being provided with a projection M on the under side adapted to support a shaft K; a shaft K having eccentrics N and O adapted to fit in the apertures J, said shaft being supported in the bearing L in the projection M, and a lever P adapted to fit the shaft K, substantially as described and for the purposes specified.

2. The combination with a driving friction-wheel A of a mechanical transmitting mechanism comprising two pairs of friction-wheels B, a pair of supporting-shafts C, two pairs of bearings D adapted to support said shafts and wheels, a pair of eccentrics N and O adapted to operate and adjust said bearings and suitable frames adapted to support said bearings, substantially as described and for the purposes specified.

WILHELM KOLLER.

Witnesses:
 JOSEPH STAAB,
 JULIUS RUBINSTEIN.